US009805318B2

(12) United States Patent
Ellis et al.

(10) Patent No.: US 9,805,318 B2
(45) Date of Patent: Oct. 31, 2017

(54) METHOD, SYSTEM AND PROGRAM PRODUCT FOR CONDITIONALLY CONTROLLING CHANGES TO KEY DATA FIELDS IN A PROJECT DATABASE

(75) Inventors: Tanya J. Ellis, London (GB); Andrew J. Garrett, Abbots Langley (GB); Scott D. Hicks, Underhill Center, VT (US); James A. Martin, Jr., Endicott, NY (US); Philip J. Taylor, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 11/460,695

(22) Filed: Jul. 28, 2006

(65) Prior Publication Data

US 2008/0027775 A1    Jan. 31, 2008

(51) Int. Cl.
G06Q 10/00    (2012.01)
G06Q 10/06    (2012.01)

(52) U.S. Cl.
CPC ........... *G06Q 10/06* (2013.01); *G06Q 10/063* (2013.01); *G06Q 10/0639* (2013.01); *G06Q 10/06316* (2013.01); *G06Q 10/06375* (2013.01)

(58) Field of Classification Search
CPC .. G06Q 10/06; G06Q 10/10; G06Q 10/06375; G06Q 10/0631; G06Q 40/04; G06Q 10/063; G06Q 10/06311; G06Q 10/0635; G06Q 10/063114; G06Q 10/0637; G06Q 10/06316; G06Q 10/063112; G06Q 10/06315; G06Q 10/06395; G06Q 10/103; G06Q 10/063118; G06Q 10/0639
See application file for complete search history.

(56) References Cited

U.S. PATENT DOCUMENTS 6,321,204 B1 * 11/2001 Kazami ............ G06Q 10/06312
 705/7.22
6,633,878 B1    10/2003 Underwood
6,944,622 B1    9/2005 Mitchell et al.
7,599,934 B2 * 10/2009 Conlan ............. G06F 17/30867
(Continued)

OTHER PUBLICATIONS

Smith, Gareth, and Rodden, Tom. An Access Model for Shared Interfaces. Lancaster University. Centre for Research in CSCW 1994. p. 1-22.*

(Continued)

*Primary Examiner* — Jamie Austin
(74) *Attorney, Agent, or Firm* — William H. Hartwell; Maxine L. Barasch; Keohane & D'Alessandro PLLC

(57) ABSTRACT

A method, system and program product for performing one or more actions in response to a change made to a key data field in a project management application for managing a project. The method includes establishing one or more metrics to be monitored for a project, defining one or more actions for at least one key data field of a plurality of key data fields in the project management application, the one or more actions being defined in accordance with a level of control to be exercised and being triggered by one or more pre-specified conditions associated with the one or more metrics monitored for the project. The method further includes automatically performing at least one action of the one or more actions in response to a relative impact to the project caused by a change made to the at least one key data field.

15 Claims, 4 Drawing Sheets

(56) References Cited

U.S. PATENT DOCUMENTS

| | | | |
|---|---|---|---|
| 2002/0026398 A1 | 2/2002 | Sheth | |
| 2002/0073114 A1 | 6/2002 | Nicastro et al. | |
| 2004/0062205 A1* | 4/2004 | Friskney | H04L 41/5009 370/252 |
| 2004/0153354 A1* | 8/2004 | Nonaka et al. | 705/8 |
| 2004/0153554 A1* | 8/2004 | Kawakami | G06F 21/34 709/229 |
| 2005/0165631 A1* | 7/2005 | Horvitz | G06Q 10/06311 705/7.16 |
| 2005/0177527 A1* | 8/2005 | Morris | G06Q 30/06 705/400 |
| 2005/0198612 A1 | 9/2005 | Gonzalez | |
| 2006/0161444 A1* | 7/2006 | Lubrecht et al. | 705/1 |
| 2006/0161879 A1* | 7/2006 | Lubrecht et al. | 717/101 |
| 2007/0006126 A1* | 1/2007 | Calkins | G06Q 10/06 717/103 |
| 2013/0282557 A1* | 10/2013 | Allin | G06Q 30/00 705/38 |

OTHER PUBLICATIONS

Headquarters, Department of the Army, "FM 25-100" Field Manual, Nov. 15, 1988, Chapter 3, Planning, all pages http://www.globalsecurity.org/military/library/policy/army/fm/25-100/chap3.htm#s26.*

* cited by examiner

METHOD, SYSTEM AND PROGRAM PRODUCT FOR CONDITIONALLY CONTROLLING CHANGES TO KEY DATA FIELDS IN A PROJECT DATABASE

FIELD OF THE INVENTION

The present invention relates to a method, system and program product for conditionally controlling changes to key data fields in a project database or a project management application for a project. More particularly, the present invention relates to a method, system and program product for automatically performing an action in response to a change made to a key data field based on a relative impact to the project caused by the change made to the key data field.

BACKGROUND OF THE INVENTION

In today's business environment, organizations and/or businesses utilize various software tools, such as, spreadsheets, databases and other project management applications to manage projects or to provide information to project teams. Such tools have data fields that contain information that characterize the project or describe work that is part of the project, where decisions are made based on the content or values in these data fields or other fields that may be calculated based upon the content or values of these data fields. Managing changes to the various data fields is a huge undertaking given that administrators who support such tools have to keep track of all the changes that are made by various individuals on various teams involved in the project. As such, there is a need for an efficient way to track changes made to data fields in order to ensure that the project is on track, without negatively impacting the completion of the project in a timely fashion.

SUMMARY OF THE INVENTION

In an aspect of the invention, there is provided a method of performing one or more actions in response to a change made to a key data field in a project management application. The method includes defining one or more activities for a project and establishing a schedule for the one or more activities for the project. Further, the method includes defining a plurality of key data fields in a project management application for managing the project. The method further includes defining one or more actions for at least one key data field of the plurality of key data fields in the project management application, the one or more actions being defined in accordance with a level of control to be exercised and being triggered by one or more pre-specified conditions associated with one or more project progression metrics monitored for the project. The method further includes performing at least one action of the one or more actions in response to a relative impact to the project caused by a change made to the at least one key data field. In an embodiment, the method further includes establishing the one or more project progression metrics to be monitored, each of the one or more project progression metrics having the one or more pre-specified conditions, such that the change made to the at least one key data field that meets a pre-specified condition of the one or more pre-specified conditions triggers performance of the at least one action. Further, the method includes determining one or more levels of control for the at least one key data field, wherein the level of control to be exercised is dictated by the pre-specified condition met for the one or more project progression metrics monitored. In an embodiment, the one or more levels of control include at least one of minimal control, intermediate control, and high control. Further, in an embodiment, the one or more project progression metrics include at least one of time period for the project, percent of project budget expended for the project, percent of work completed for the project and specific milestones surpassed for the project. Furthermore, in an embodiment, the one or more actions include at least one of logging the change to the at least one key data field, preventing the change to the at least one key data field from being finalized based upon a field value of the at least one key data field, preventing the change to the at least one key data field from being finalized based upon a field value of another data field in the project management application, preventing the change to the at least one key data field, sending notification of the change to the at least one key data field to a distribution list of users, restricting access to change the at least one key data field to a list of approved users, requiring approval from one or more users prior to finalizing the change to the at least one key data field, determining an additional project cost to implement the change to the at least one key data field, sending an invoice for the additional project cost to a customer, and canceling one or more activities for the project.

In another aspect of the invention, there is provided a system for conditionally controlling a change made to a key data field in a project management application. The system includes a project management application running on at least one server of a plurality of servers coupled to a computer network, the project management application being configured to manage a project. Further, the project management application includes a conditional controls component running on the at least one server for performing at least one pre-specified action in response to a change made to a key data field in the project management application, the conditional controls component being configured to monitor one or more metrics pertaining to progress of the project, each of the one or more metrics having one or more pre-specified conditions, each of the one or more pre-specified conditions having an associated level of control and one or more pre-specified actions to be taken when a pre-specified condition is met, such that an increasing level of control is exercised when performing the at least one pre-specified action in response to the change made to the key data field as the project progresses. In an embodiment, the one or more metrics include at least one of time period for the project, percent of project budget expended for the project, percent of work completed for the project and specific milestone surpassed for the project. Further, in an embodiment, the associated level of control includes at least one of minimal control, intermediate control, and high control. Moreover, in an embodiment, the at least one pre-specified action includes at least one of logging the change to the key data field, preventing the change to the key data field from being finalized based upon a field value of the key data field, preventing the change to the key data field from being finalized based upon a field value of another data field in the project management application, preventing the change to the key data field, sending notification of the change to a distribution list of users, restricting access to change the key data field to a list of approved users, requiring approval from one or more users prior to finalizing the change, determining an additional project cost to implement the change, sending an invoice for the additional project costs to a customer, and canceling one or more activities for the project.

In yet another aspect of the invention, there is provided a computer program product for implementing one or more actions in response to a change made to a key data field in a project management application for a project. The computer program product includes a computer readable medium and first program instructions to define one or more actions to be performed for a key data field of a plurality of key data fields, each of the one or more actions corresponding to a level of control of a plurality of levels of control to be exercised in response to a change made to the key data field of the plurality of key data fields. Further, the computer program product includes second program instructions to establish one or more metrics to be monitored for the project, each of the one or more metrics having one or more pre-specified conditions, such that the change made to the key data field that meets a pre-specified condition triggers implementation of the one or more actions. Furthermore, the computer program product includes third program instructions to implement at least one action of the one or more actions defined based on the pre-specified condition that is met and corresponding to the level of control to be exercised in response to the change made to the key data field. In an embodiment, the first program instructions include instructions to define a plurality of key data fields in a project management application for managing a project. Further, in an embodiment, the second program instructions include instructions to monitor whether or not the one or more pre-specified conditions associated with the one or more metrics have been met in order to trigger performance of the at least one action in response to the change made to the key data field. Preferably, each of the first, second and third program instructions are stored on the computer readable medium. In an embodiment, the level of control to be exercised is dictated by the pre-specified condition met for the one or more metrics monitored. Further, in an embodiment, the one or more levels of control include at least one of minimal control, intermediate control, and high control. Moreover, in an embodiment, the one or more metrics include at least one of time period for the project, percent of project budget expended for the project, percent of work completed for the project and specific milestone surpassed for the project. Furthermore, in an embodiment, the one or more actions include at least one of logging the change to the data field, preventing the change to the data field from being finalized based upon a field value of the data field, preventing the change to the data field from being finalized based upon a field value of another data field in the project management application, preventing the change to the at least one key data field, sending notification of the change to a distribution list of users, restricting access to change the data field to a list of approved users, requiring approval from one or more users prior to finalizing the change, determining an additional project cost to implement the change, sending an invoice for the additional project costs to a customer, and canceling one or more activities for the project.

Further, in yet another aspect of the invention, there is provided a process for deploying computing infrastructure comprising integrating computer-readable code into a computing system, wherein the code in combination with the computing system is capable of performing one or more actions in response to a change made to a key data field in a project management application. The process includes defining a plurality of key data fields in a project management application for managing a project, establishing one or more metrics to be monitored for the project, each of the one or more metrics having one or more pre-specified conditions that when met trigger performance of one or more actions and identifying one or more levels of control to be exercised for a key data field of a plurality of key data fields based on a relative impact to the project caused by a change made to the key data field. The process further includes establishing the one or more actions to be performed in response to the change made to the key data field of the plurality of key data fields and performing at least one action of the one or more actions corresponding to a level of control of the one or more levels of control to be exercised and triggered by at least one pre-specified condition of the one or more pre-specified conditions that is met, wherein the at least one action is performed in response to the change made to the key data field. The process further includes recording the change made to the key data field and sending communication regarding the at least one action of the one or more actions performed. Further, in an embodiment, the one or more levels of control include at least one of minimal control, intermediate control, and high control, whereas, the one or more metrics include at least one of time period for the project, percent of project budget expended for the project, percent of work completed for the project and specific milestone surpassed for the project. Moreover, in an embodiment, the one or more actions include at least one of logging the change to the data field, preventing the change to the data field from being finalized based upon a field value of the data field, preventing the change to the data field from being finalized based upon a field value of another data field in the project management application, preventing the change to the at least one key data field, sending notification of the change to a distribution list of users, restricting access to change the data field to a list of approved users, requiring approval from one or more users prior to finalizing the change, determining an additional project cost to implement the change, sending an invoice for the additional project costs to a customer, and canceling one or more activities for the project.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
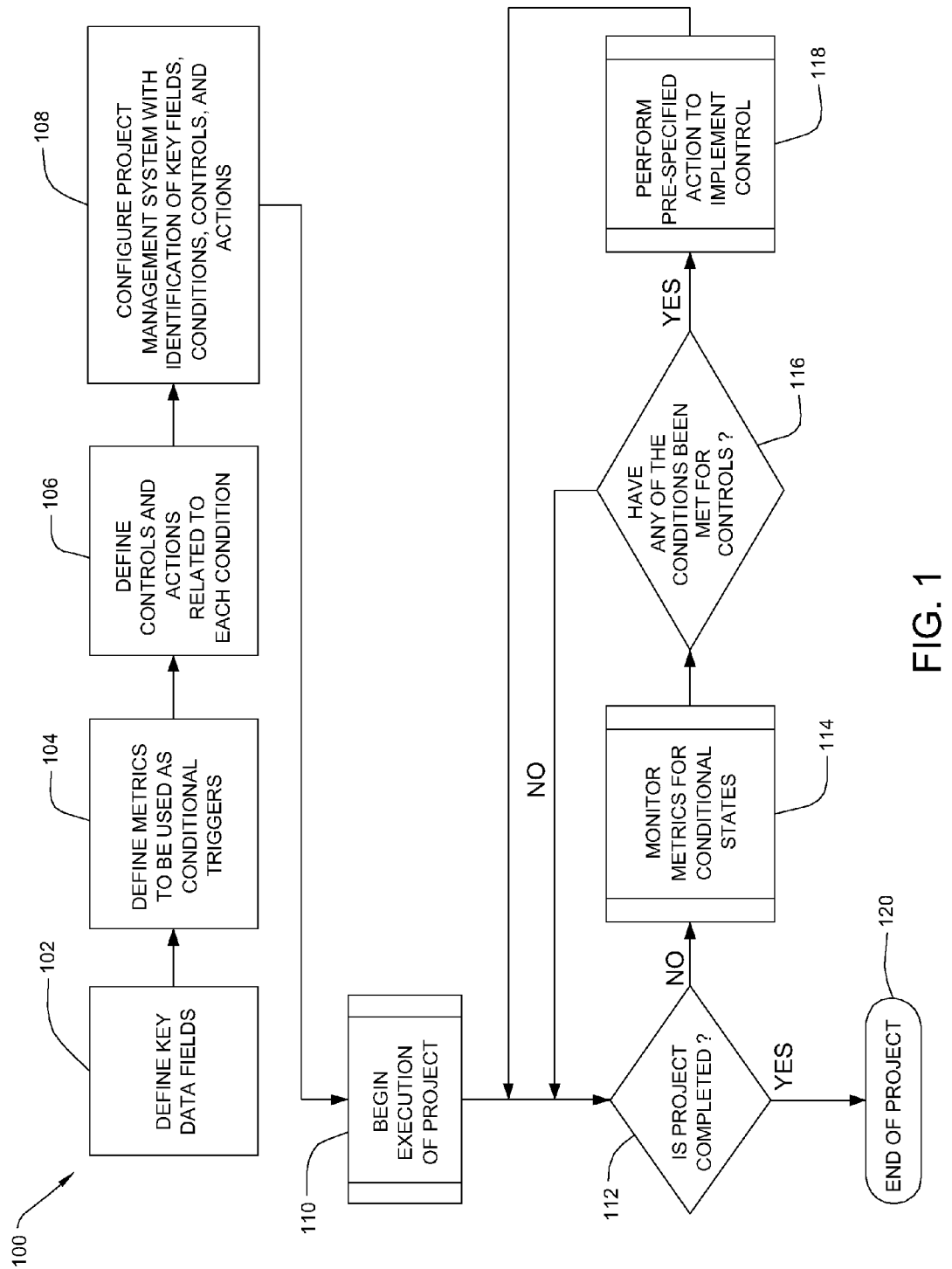
FIG. 1 is a flowchart depicting a method for performing one or more actions in response to a change made to a key data field in a project management application, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and over disparate memory devices.

Furthermore, modules may also be implemented as a combination of software and one or more hardware devices. For instance, a module may be embodied in the combination of a software executable code stored on a memory device. In a further example, a module may be the combination of a processor that operates on a set of operational data.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In an embodiment, the invention provides a method of performing one or more actions in response to a change made to a key data field in a project management application. The method comprises defining one or more activities for a project and establishing a schedule for the one or more activities for the project. Further, the method comprises defining a plurality of key data fields in a project management application for managing the project. The method further comprises defining one or more actions for at least one key data field of the plurality of key data fields in the project management application, the one or more actions being defined in accordance with a level of control to be exercised and being triggered by one or more pre-specified conditions associated with one or more project progression metrics monitored for the project. The method further includes performing at least one action of the one or more actions in response to a relative impact to the project caused by a change made to the at least one key data field. In an embodiment, the method further comprises establishing the one or more project progression metrics to be monitored, each of the one or more project progression metrics having the one or more pre-specified conditions, such that the change made to the at least one key data field that meets a pre-specified condition of the one or more pre-specified conditions triggers performance of the at least one action. Further, the method comprises determining one or more levels of control for the at least one key data field, wherein the level of control to be exercised is dictated by the pre-specified condition met for the one or more project progression metrics monitored. In an embodiment, the one or more levels of control comprise at least one of minimal control, intermediate control, and high control. Further, in an embodiment, the one or more project progression metrics comprise at least one of time period for the project, percent of project budget expended for the project, percent of work completed for the project and specific milestones surpassed for the project. Furthermore, in an embodiment, the one or more actions comprise at least one of logging the change to the at least one key data field, preventing the change to the at least one key data field from being finalized based upon a field value of the at least one key data field, preventing the change to the at least one key data field from being finalized based upon a field value of another data field in the project management application, preventing the change to the at least one key data field, sending notification of the change to the at least one key data field to a distribution list of users, restricting access to change the at least one key data field to a list of approved users, requiring approval from one or more users prior to finalizing the change to the at least one key data field, determining an additional project cost to implement the change to the at least one key data field, sending an invoice for the additional project cost to a customer, and canceling one or more activities for the project.

Figure 2:
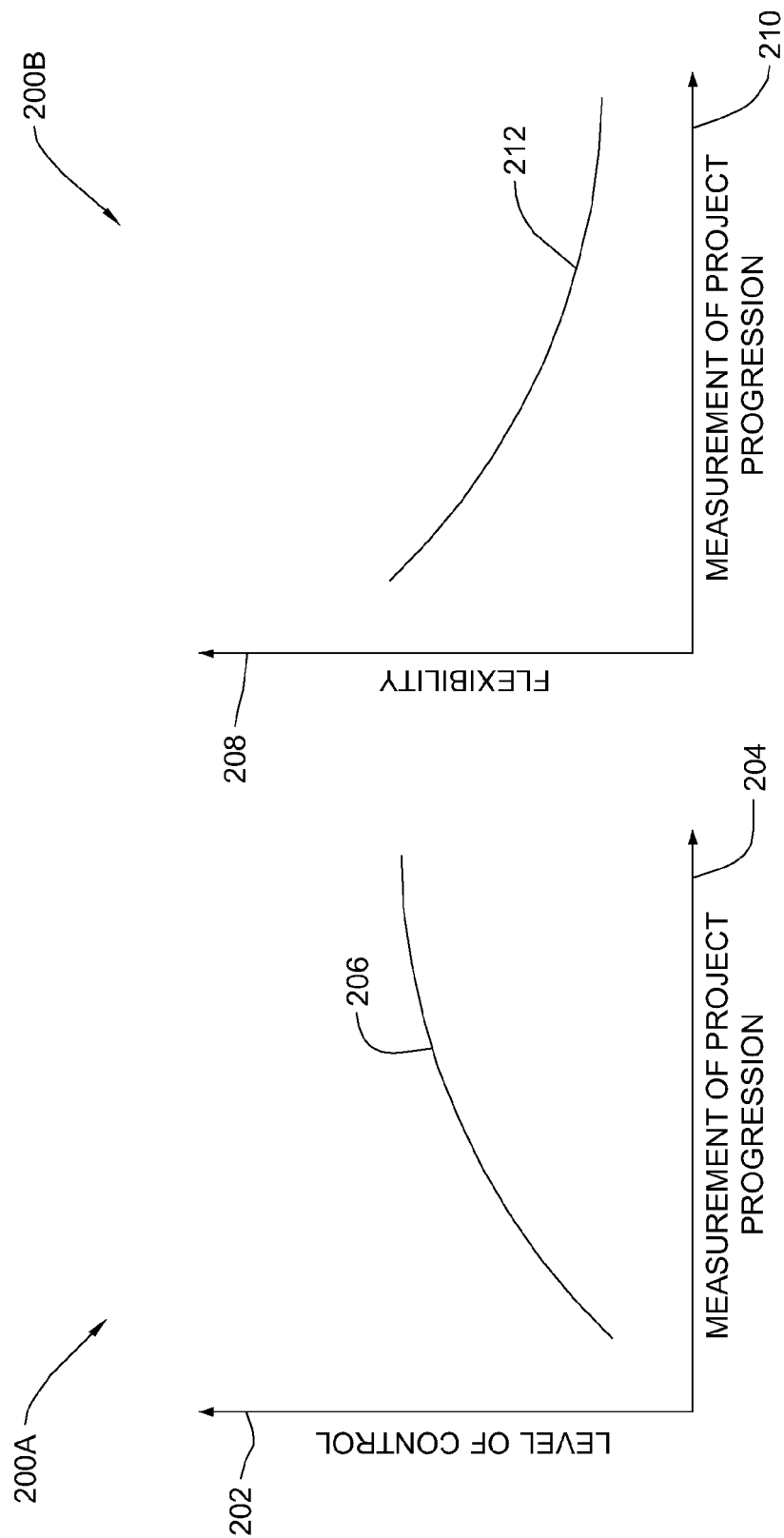
FIG. 2A is a graph depicting the relationship between the level of control exercised with respect to a change made to a key data field versus the measurement of project progression, in accordance with an embodiment of the present invention.
FIG. 2B is a graph depicting the relationship between flexibility to change a key data field versus the measurement of project progression in accordance with an embodiment of the present invention.

Reference is now made to FIG. 1 and FIGS. 2A and 2B, which illustrate a method of performing one or more actions in response to a change made to a key data field in a project management application, in accordance with an embodiment of the invention. Turning to FIG. 1, the method or process 100 of performing one or more actions in response to a change made to a key data field in a project management application starts at step 102 with defining key data fields in the project management application for the project. In an embodiment, the project management application is any enterprise migration software or tool used to manage migration projects that is commercially available, such as, the Enterprise Migration Manager application program that is commercially available as part of a services engagement from International Business Machines (IBM) Corporation. A project manager establishes a sequence of activities (grouping of tasks) that need to be scheduled in order to complete the project in a timely fashion and determines the key data fields that need to be managed for the project. The key data fields vary depending on the project, so the key data fields are defined based on what is needed to accomplish the project. Each data field has a field description that sets forth what is in there, the format, etc. as well as contains a field value that can be changed by a user. Further, in step 104 of FIG. 1, one has to define one or more metrics pertaining to the progress of the project (also, referred to herein as project progression metrics) and pre-specify conditions that need to be monitored for each of the one or more metrics so that the monitored metrics can be used as conditional triggers in response to a change made to a key data field. Some examples of project progression metrics to be monitored include time period or phases, percent of project budget expended, percent of work completed and specific milestones surpassed. Further, some examples of pre-specified conditions associated with the metrics monitored for time, may be whether the project is in its early stages or middle stages or late stages. Similarly, varying conditions for the metrics associated with percent of project budget expended can be pre-specified, such as, 10-25% of project budget, 26-50% of project budget, etc. For each of the pre-specified conditions, in step 106, controls and corresponding actions are defined so that when a change is made to a key data field appropriate actions can be automatically performed. In particular, the controls placed on a key data field may be a low level of control where access is permitted to anyone involved in the project, or the controls placed on a key data field may be an intermediate level of control where access may still be permitted to anyone, however, notification rules may be triggered or the access may be limited to middle level and/or upper level of management. Furthermore, the controls placed on a key data field may be a high level of control such that perhaps only an upper level managing the project can make changes and/or require committee approval and/or trigger alerting individuals regarding any financial consequences arising as a result of the change. For instance, for the metrics pertaining to time, the pre-specified condition of early stages may have a low or minimal level of control associated with it where access to change a key data field is permitted to anyone and as such, the actions defined that correspond to a low level of control may include simply recording a change made to a key data field. However, if the pre-specified condition for time is that of a middle stage of the project, then the associated level of control may be an intermediate level, such that the actions defined that correspond to an intermediate level of control may include limiting access to a few authorized users or to record the change and notify all those involved in the project. Similarly, if the pre-specified condition for time is a late stage of the project, then the associated level of control may be a high level where perhaps only a few individuals can access the key data fields and where certain notification rules comes into play, so that the actions defined that correspond to a high level of control may include sending changes to a review committee or rescheduling activities or not allowing the change to be made to the key data field. As one can appreciate, the levels of control placed on a key data field may vary depending on the nature of a project. There can be more levels of control placed on a field, for example, ranging from a very low, low, intermediate, high to a very high level of control. Similarly, there can be less levels of control placed on a field, for example, there may be only a low level of control and a high level of control placed on a key data field.

In a similar fashion, pre-specified conditions for the metric of percent of budget expended can be linked to the different levels of control, which in turn dictate the actions to be performed in response to a change in a key data field. For instance, the pre-specified conditions for budget may be set as follows: 0-33% of the budget expended, 34-66% of the budget expended, and 67-100% of the budget expended. Moreover, the level of control to be exercised when the pre-specified condition of 0-33% of the budget has been expended is met may be a low level, whereas, the level of control to be exercised when the pre-specified condition of 34-66% of the budget has been expended is met may be an intermediate level and, further, where the level of control to be exercised when the pre-specified condition of to be exercised when the pre-specified condition of 67-100% of the budget has been expended is met may be a high level of control, such that if a change is made to a key field then appropriate action or actions are performed if the respective pre-specified condition is met. For instance, the action to be performed when only 0-33% of the budget is expended or spent may be simply to record the change to the key data field, whereas if 60% of the budget is spent then an action linked to an intermediate level of control, such as sending changes to a review committee before finalizing the changes is performed. Similarly, if 90% of the budget is spent then an action linked to a high level of control may be triggered, such as canceling activities or triggering financial consequences. In such a situation, a notice can be sent to alert individuals of the financial consequences in monetary and or labor units based on configurable rules. Further, the system may send or issue a bill for financial consequences. Accordingly, in step 108, the project management application or system is configured so that the key data fields that have been defined or identified, as well as the pre-specified conditions, associated levels of control and the corresponding pre-specified actions can be set forth so that the system can automatically perform an action having an appropriate control level given the existing condition when a change is made to a key data field in the project management application. In step 110, the execution of the project management application for managing a project is begun. A determination is made in step 112 as to whether or not the project is completed. If the project is completed ("yes" branch), then the process ends in step 120. However, if the project is not completed ("no" branch), the method includes monitoring in step 114 the pre-specified conditions for the metrics defined. Next, in step 116, a determination is made as to whether or not any of the pre-specified conditions have been met, so that controls can be exercised via the performance of actions in response to a change made to a key data field. If any of the pre-specified conditions are met in step 116 ("yes" branch), then the pre-specified action or actions corresponding to the level of control defined for the pre-specified action is performed in step 118. If none of the pre-specified conditions have been met in step 116 ("no" branch), or after the pre-specified action or actions have been performed in step 118, the method returns to step 112 where a determination is made as to whether or not the project is complete. If the project is complete in step 112 ("yes" branch), the process ends at step 120 and, if not ("no" branch), the steps 114 through 118 are repeated until the project is completed, ending at step 120.

Turning to FIGS. 2A and 2B, reference numeral 200A in FIG. 2A shows the relationship between the level of control exercised with respect to a change made to a key data field versus the measurement of project progression, whereas, reference numeral 200B in FIG. 2B show the relationship between flexibility to change a key data field versus the measurement of project progression. Referring to FIG. 2A, the y-axis (reference numeral 202) represents the level of control exercised for a change made to a key data field that meets a specified condition. Further, the x-axis (reference numeral 204) represents various metrics that represent the progression of the project that are monitored, such as time, percentage of budget expended, percentage of work completed, specific milestones surpassed, etc. As shown by the graph 206, the level of control exercised for a change made to a key data field that meets a specified condition associated with a measurement or metric monitored increases as the project progresses. Thus, the actions performed correspond to the level of control exercised based on the measurement of project progression. Similarly, referring to FIG. 2B, the y-axis (reference numeral 208) represents the flexibility to change a key data field for a project, whereas, the x-axis (reference numeral 210) represents various metrics that represent the progression of the project that are monitored, such as time, percentage of budget expended, percentage of work completed, specific milestones surpassed, etc. As shown by the graph 212, flexibility to change a key data field decreases as the project progresses.

In another embodiment, the invention provides a system for conditionally controlling a change made to a key data field in a project management application. The system comprises a project management application running on at least one server of a plurality of servers coupled to a computer network, the project management application being configured to manage a project. Further, the project management application comprises a conditional controls component configured to perform at least one pre-specified action in response to a change made to a key data field in the project management application, the conditional controls component being configured to monitor one or more metrics pertaining to progress of the project, each of the one or more metrics having one or more pre-specified conditions, each of the one or more pre-specified conditions having an associated level of control and one or more pre-specified actions to be taken when a pre-specified condition is met, such that an increasing level of control is exercised when performing the at least one pre-specified action in response to the change made to the key data field as the project progresses. In an embodiment, the one or more metrics comprise at least one of time period for the project, percent of project budget expended for the project, percent of work completed for the project and specific milestones surpassed for the project. Further, in an embodiment, the associated level of control comprises at least one of minimal control, intermediate control, and high control. Moreover, in an embodiment, the at least one pre-specified action comprises at least one of logging the change to the key data field, preventing the change to the key data field from being finalized based upon a field value of the key data field, preventing the change to the key data field from being finalized based upon a field value of another data field in the project management application, preventing the change to the key data field, sending notification of the change to a distribution list of users, restricting access to change the key data field to a list of approved users, requiring approval from one or more users prior to finalizing the change, determining an additional project cost to implement the change, sending an invoice for the additional project costs to a customer, and canceling one or more activities for the project.

Figure 3:
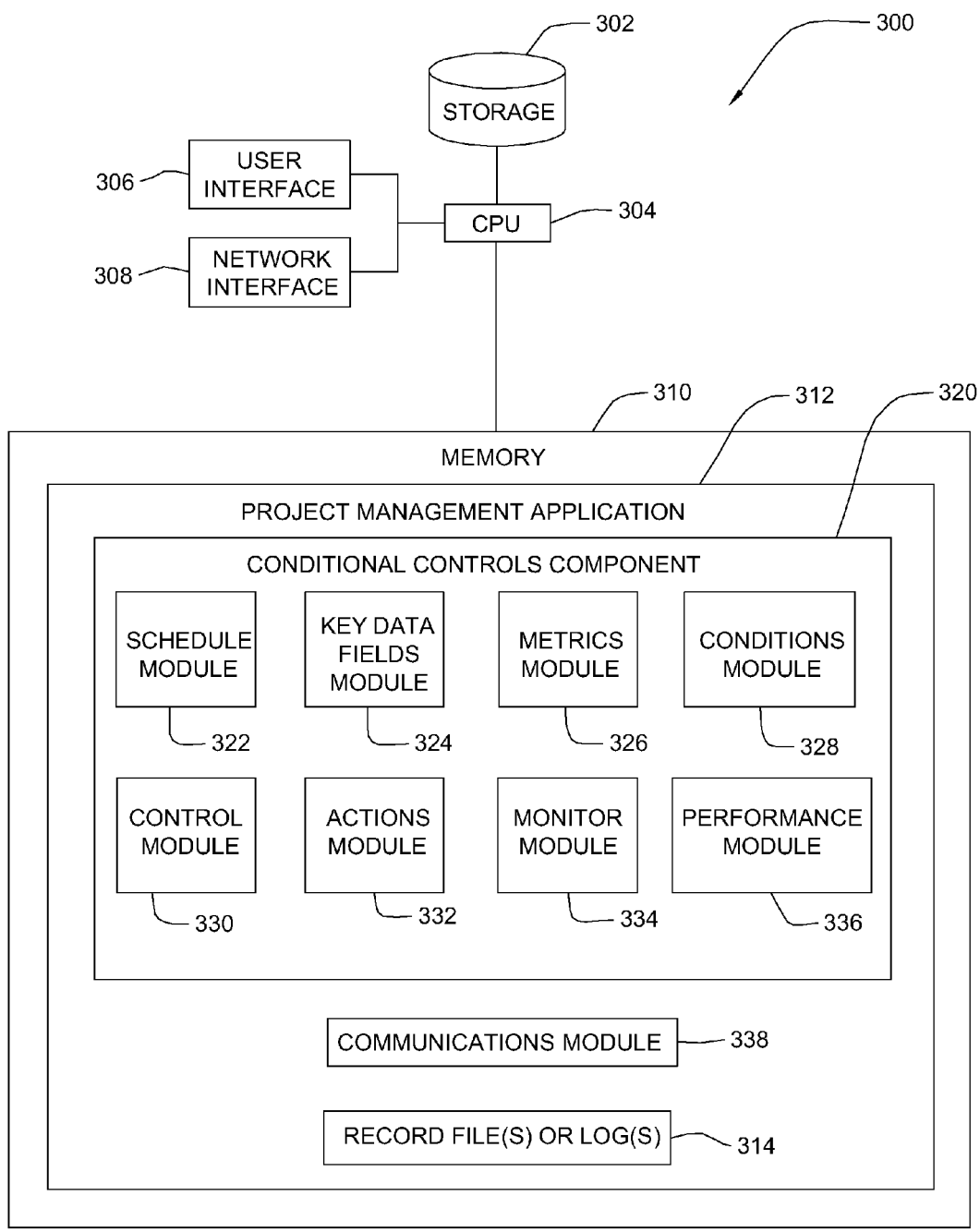
FIG. 3 is a schematic block system diagram illustrating a computer system for implementing one or more actions in response to a change made to a key data field, in accordance with an embodiment of the present invention.

Turning to FIG. 3, FIG. 3 shows an embodiment of a computer system 300 that includes a conditional controls component or tool 320 for performing one or more actions in response to a change made to a key data field in a project management application or database. The system 300 includes a central processing unit (CPU) 304, a local storage device 302, a user interface 306, a network interface 308, a memory 310, and a conditional controls component or tool 320. The CPU 304 is configured generally to execute operations within the computer system 300. The user interface 306, in one embodiment, is configured to allow a user to interact with the computer system 300, including allowing input data and commands from a user and communicating output data to the user. The network interface 308 is configured, in one embodiment, to facilitate network communications of the computer system 300 over a communications channel of a network (not shown in FIG. 3). The local memory 310 is configured, in one embodiment, to store a project management application 312, which includes the conditional controls component 320. In an embodiment, the conditional controls component configures the different data fields provided in the field definition document of the project management application or system. Additionally, in one embodiment, the local memory 310 may be configured to store several data and metadata files that may be used in conjunction with conditionally controlling one or more changes to one or more key data fields.

In a preferred embodiment, the conditional controls component 320 of the project management application 312 includes a Schedule module 322, a Key Data Fields module 324, a Metrics module 326, a Conditions module 328, a Controls module 330, an Actions module 332, a Monitor module 334, a Performance module 336 and a Communications module 338. The Schedule module 322 is configured to establish a schedule of activities for a project. The Key Data Fields module 324 is configured to define one or more key data fields in a project management application or system 312 for the project. In an embodiment, the key data field definitions are stored in a configuration file on the system 300, for instance, in the local memory 310 or storage 302 (not shown in FIG. 3). The Metrics module 326 is configured to define or establish one or more metrics or measurements to be monitored for measuring progress of the project. Further, the Conditions module 328 is configured to pre-specify one or more conditions for each of the one or more metrics that track progression of the project, whereas, the Controls module 330 is configured to identify a level of control to be associated with each of the pre-specified conditions. Furthermore, the Actions module 332 is configured to define or specify one or more actions to be performed in response to a change made to a key data field when a pre-specified condition is met, where the one or more actions correspond to the level of control associated with the pre-specified condition that is met. The Monitor module 334 is configured to monitor the one or more metrics established by the Metrics module 326 and to determine when a pre-specified condition has been met that would trigger performing one or more actions specified by the Actions module 332. The Performance module 336 is configured to automatically perform the one or more actions triggered when a pre-specified condition has been met. The Communications module 338 is configured to communicate action(s) that are automatically performed in response to a change that is made to a key data field. In a preferred embodiment, the project management application 312 includes or contains one or more record files or logs 314, which log or keep record of any changes that are made or any changes that are denied to key data fields in the system over a period of time. Alternatively, the record files or logs 314 may be stored in the memory 310 and/or the storage system 302.

As such, data fields in a project database or other project management application can be flagged as being key data fields, such that changes to the data content will trigger actions automatically performed by the performance module 336 that are appropriate to the impact of the data changes in the current phase of the project as set forth in the actions module 332. In an embodiment, the necessary actions are automated. In particular, in the key data fields module 324 activities (groups of tasks), tasks, or data elements can be marked as being key data fields that will be subject to conditional controls as set forth in the conditions module 328. For example, early in the project, setting or modifying a target date for a critical action that is many months away may be acceptable and allowable by any individual part of the project given that there is sufficient time left to complete the project and plenty of resources to adjust to the change. Thus, the only action to be performed may be to record the change. A while later into the project, it may still be acceptable to change the target date, but the action to be performed may be to notify a list of people regarding the change. Further on in the project, it may be desirable to place controls as to who can change the target date. Still later on, a change in the target date may require an action, such as a review by a management committee or a change review board. Later still in the project, a change may be approved, but there could be financial consequences that are automatically triggered due to contractual agreements. Finally, there may be a date beyond which no changes are allowed without having to cancel the activity. This is just one combination of conditions, controls and appropriate actions that may be performed at various phases in a project. The controls may be related to factors other than time. For example, triggering of controls may occur due to financial considerations. When less than 10% of the project budget has been spent there may be more lenient controls than when only 10% remains. Once a field has been marked and the conditions and the actions have been defined, the project database or other program management application can be configured to automatically take actions, such as establishing a pre-configured distribution list, which can be used to send automatic notifications of changes to key data fields. Also, a change control process can be activated, with e-mail notices automatically being sent to members of a change review board. In an embodiment, the notices can describe the proposed change, and provide a means for replying with approval or disapproval, and comments or proposed modifications. As such, a notice can be sent to alert people of the financial consequences, with the consequences being quantified in monetary and/or labor units based on configurable rules. For instance, a bill may be automatically issued for any financial consequences that may be incurred in accordance with contractual agreements. As mentioned above, the levels of control placed on a key data field may vary depending on the nature of a project. There can be more levels of control placed on a field or there can be less levels of control placed on a key data field.

In yet another embodiment, the present invention provides a computer program product for implementing one or more actions in response to a change made to a key data field in a project management application or a project database for a project. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Further, preferably, network medium can comprise of transmission devices on a network, such as, cables, routers, switches and/or network adapter cards.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc—read only memory (CD-ROM), compact disc—read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In an embodiment, the computer program product includes first program instructions to define one or more actions to be performed for a key data field of a plurality of key data fields, each of the one or more actions corresponding to a level of control of a plurality of levels of control to be exercised in response to a change made to the key data field of the plurality of key data fields. In an embodiment, the plurality of levels of control comprises at least one of minimal control, intermediate control, and high control. The computer program product further includes second program instructions to establish one or more metrics to be monitored for the project, each of the one or more metrics having one or more pre-specified conditions, such that the change made to the key data field that meets a pre-specified condition triggers implementation of the one or more actions that have been defined. In an embodiment, the one or more metrics comprise at least one of time period for the project, percent of project budget expended for the project, percent of work completed for the project and specific milestones surpassed for the project. Further, the computer program product includes third program instructions to implement at least one action of the one or more actions defined based on the pre-specified condition that is met and corresponding to the level of control to be exercised in response to the change made to the key data field. In an embodiment, the first program instructions include instructions to define a plurality of key data fields in a project management application for managing a project. Further, in an embodiment, the second program instructions include instructions to monitor whether or not the one or more pre-specified conditions associated with the one or more metrics have been met in order to trigger performance of the at least one action in response to the change made to the key data field. Preferably, each of the first, second and third program instructions are stored on the computer readable medium. Further, in an embodiment, the level of control to be exercised is dictated by the pre-specified condition that is met for the one or more metrics monitored for the project. Furthermore, in an embodiment, the one or more actions comprise at least one of logging the change to the data field, preventing the change to the data field from being finalized based upon a field value of the data field, preventing the change to the data field from being finalized based upon a field value of another data field in the project management application, preventing the change to the at least one key data field, sending notification of the change to a distribution list of users, restricting access to change the data field to a list of approved users, requiring approval from one or more users prior to finalizing the change, determining an additional project cost to implement the change, sending an invoice for the additional project costs to a customer, and canceling one or more activities for the project.

Figure 4:
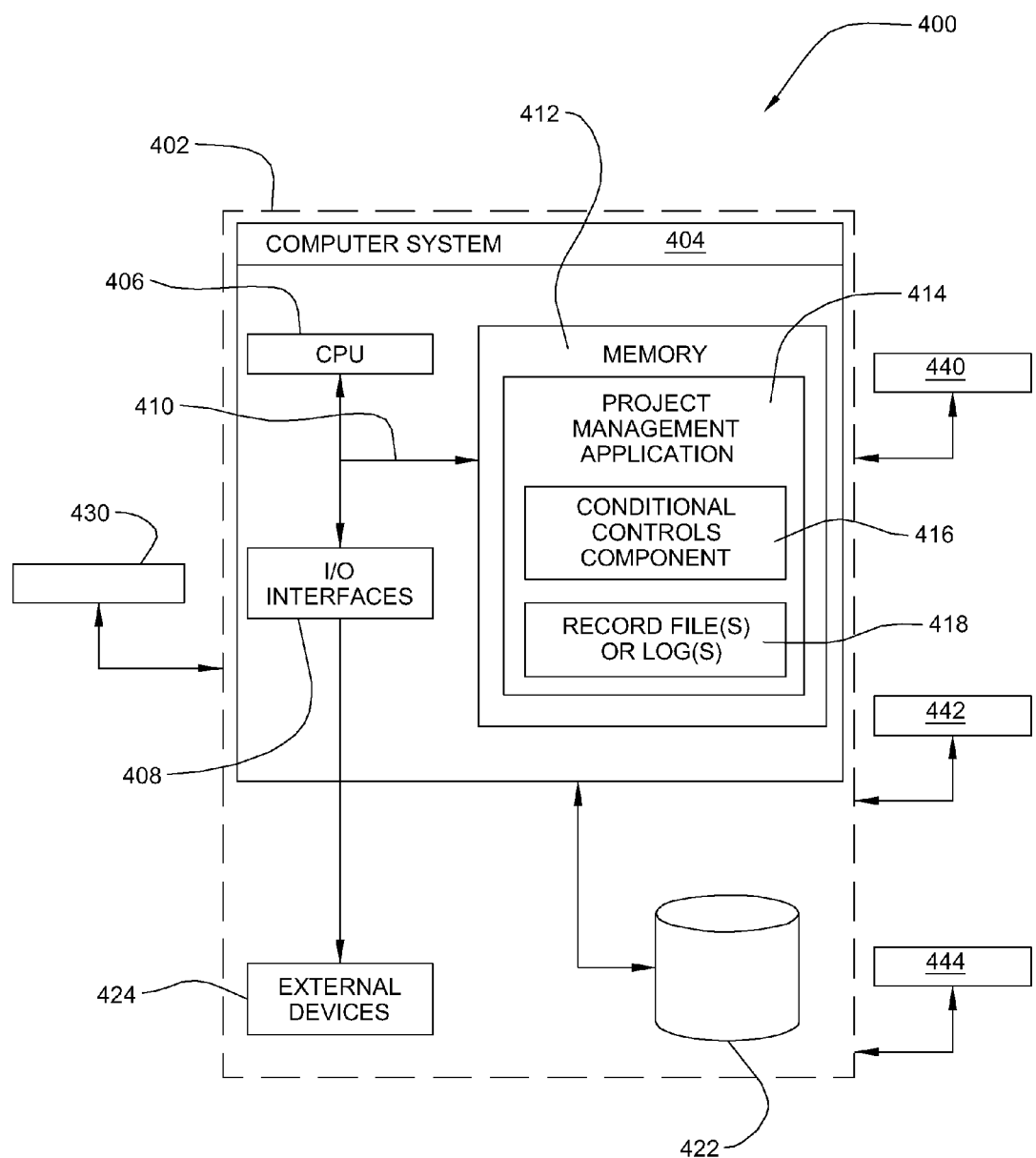
FIG. 4 is a schematic block system diagram illustrating a computer system having a computer program product for implementing one or more actions in response to a change made to a key data field, in accordance with an embodiment of the present invention.

Referring now to FIG. 4, there is illustrated a system 400 for implementing one or more actions in response to a change made to a key data field in a project management application or project database for a project, according to the present invention. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a server or the like. It should be understood, however, that although not shown, other hardware and software components (e.g., additional computer systems, such as, additional servers, routers, firewalls, etc.) could be included in infrastructure 402.

In general, a manager or administrator 430 at an administrative server or a designated computer system interfaces with infrastructure 402 to manage a project using a project management application 414 running on computer system 404. Similarly, one or more authorized employees at respective systems 440 and 442 can interface with infrastructure 402 to manage the project. To this extent, infrastructure 402 provides a secure environment. In general, the parties could access infrastructure 402 directly, or over a network via interfaces (e.g., client web browsers) loaded on computerized devices (e.g., personal computers, laptops, handheld devices, etc., not shown in FIG. 4). In the case of the latter, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 444, or by an independent entity. Regardless, use of infrastructure 402 and the teachings described herein could be offered to the parties on a subscription or fee-basis. In either scenario, an administrator at an administrative server or any other designated computer system (reference numeral 430) could support and configure infrastructure 402.

Computer system 404 is shown to include a CPU (hereinafter "processing unit 406"), a memory 412, a bus 410, and input/output (I/O) interfaces 408. Further, computer system 400 is shown in communication with external I/O devices/resources 424 and storage system 422. In general, processing unit 406 executes computer program codes, such as the project management application 414 that includes the conditional controls component 416 and shown as stored in memory 410 in FIG. 4, but which could be stored in storage system 422. While executing the project management application 414 and/or the conditional controls component 416, the processing unit 406 can read and/or write data, such as the record file(s) or log(s) 418 to/from memory 412, storage system 422, and/or I/O interfaces 408. Bus 410 provides a communication link between each of the components in computer system 400. External devices 424 can comprise any devices (e.g., keyboard, pointing device, display, etc.) that enable a user to interact with computer system 400 and/or any devices (e.g., network card, modem, etc.) that enable computer system 400 to communicate with one or more other computing devices.

Computer infrastructure 402 is only illustrative of various types of computer infrastructures for implementing the invention. For example, in one embodiment, computer infrastructure 402 comprises two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc., not shown in FIG. 4) can be included in computer system 400. However, if computer system 400 comprises a handheld device or the like, it is understood that one or more external devices 424 (e.g., a display) and/or storage system(s) 422 could be contained within computer system 400, and not externally as shown. Storage system 422 can be any type of system (e.g., a database) capable of providing storage for information under the present invention. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Further, in yet another embodiment, the present invention provides a process for deploying computing infrastructure comprising integrating computer-readable code into a computing system, wherein the code in combination with the computing system is capable of performing one or more actions in response to a change made to a key data field in a project management application. The process comprises defining a plurality of key data fields in a project management application for managing a project, establishing one or more metrics to be monitored for the project, each of the one or more metrics having one or more pre-specified conditions that when met trigger performance of one or more actions and identifying one or more levels of control to be exercised for a key data field of a plurality of key data fields based on a relative impact to the project caused by a change made to the key data field. The process further comprises establishing the one or more actions to be performed in response to the change made to the key data field of the plurality of key data fields and performing at least one action of the one or more actions corresponding to a level of control of the one or more levels of control to be exercised and triggered by at least one pre-specified condition of the one or more pre-specified conditions that is met, wherein the at least one action is performed in response to the change made to the key data field. The process further comprises recording the change made to the key data field and sending communication regarding the at least one action of the one or more actions performed to those involved in the project. Further, in an embodiment, the one or more levels of control comprise at least one of minimal control, intermediate control, and high control, whereas, the one or more metrics comprise at least one of time period for the project, percent of project budget expended for the project, percent of work completed for the project and specific milestones surpassed for the project. Moreover, in an embodiment, the one or more actions comprise at least one of logging the change to the data field, preventing the change to the data field from being finalized based upon a field value of the data field, preventing the change to the data field from being finalized based upon a field value of another data field in the project management application, preventing the change to the at least one key data field, sending notification of the change to a distribution list of users, restricting access to change the data field to a list of approved users, requiring approval from one or more users prior to finalizing the change, determining an additional project cost to implement the change, sending an invoice for the additional project costs to a customer, and canceling one or more activities for the project.

Accordingly, any of the components of the present invention as shown in FIG. 4 can be deployed, managed, serviced by a service provider who offers a system for performing one or more actions in response to a change made to a data field in a project management application or project database. Preferably, the invention provides a business method that performs the process steps of the invention on a subscription, advertising and/or fee basis. In particular, a service provider, such as a solution integrator could offer to perform or implement one or more actions in response to a change made to a data field in a project management application or project database. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of performing one or more pre-specified actions in response to a change made to a key data field in a project management application, said method comprising the steps of:

defining a plurality of key data fields in a project database for managing said project;

flagging, within the project database stored in computer-readable memory, a key data field of the plurality of key data fields, the flagging causing a change to data content of the key data field to automatically trigger one or more pre-specified actions performed by a project management computer system having a project management application loaded thereon for managing migration of a project, said project management application including a conditional controls component for automating performance of the one or more pre-specified actions in response to the change made to a key data field of a plurality of key data fields defined in said project management application at a particular time period corresponding to said change made in said project;

recording said change made to said key data field;

establishing one or more metrics to be monitored for the project, each of said one or more metrics having one or more pre-specified conditions that when met trigger performance of the one or more pre-specified actions, wherein said one or more metrics comprise: time period for said project, percent of project budget expended for said project, percent of work completed for said project and specific milestones surpassed for said project;

monitoring, using said conditional controls component, the one or more metrics for said project;

defining, in said conditional controls component, one or more pre-specified actions for at least one key data field of said plurality of key data fields in said project management application for managing said project, said one or more pre-specified actions being defined in accordance with a level of control over changes that may be made to said at least one key data field of said plurality of key data fields to be exercised, wherein said level of control is selected from a plurality of progressively restrictive levels of control defining who is permitted to make changes to said at least one key data field of said plurality of key data fields;

performing, using said conditional controls component, at least one pre-specified action of said one or more pre-specified actions in response to a relative impact to said project caused by said change made to said at least one key data field, wherein said at least one pre-specified action performed corresponds to a respective level of control over changes that may be made to said at least one key data field of said plurality of key data fields to be exercised in response to said relative impact to said project depending at least in part on said time period corresponding to said change, and wherein said respective level of control to be exercised increases with time;

after achievement of a pre-established date and budget threshold value, triggering, by a change to a key data field, a pre-specified action comprising emailing a notification to members of a change review board, along with a set of financial consequences quantified in monetary or labor units caused by said change to the key data field, the notification requiring review a reply with an approval before proceeding with the change to the key data field;

sending a communication regarding said at least one pre-specified action of said one or more pre-specified actions performed; and sending an invoice for the set of financial consequences.

2. The method according to claim 1, further comprising the step of:

determining one or more levels of control for said at least one key data field, wherein said level of control to be exercised is dictated by said one or more pre-specified conditions met for said one or more project progression metrics monitored.

3. The method according to claim 2, further comprising the steps of:

defining one or more activities for said project; and
establishing a schedule for said one or more activities for said project.

4. The method according to claim 3, wherein the level of control is based on at least one pre-specified condition, of said one or more pre-specified conditions, being met.

5. The method according to claim 1, wherein said one or more pre-specified actions comprise at least one of: logging said change to said at least one key data field, preventing said change to said at least one key data field from being finalized based upon a field value of said at least one key data field, preventing said change to said at least one key data field from being finalized based upon a field value of another data field in said project management application, preventing said change to said at least one key data field, sending notification of said change to said at least one key data field to a distribution list of users, restricting access to change said at least one key data field to a list of approved users, requiring approval from one or more users prior to finalizing said change to said at least one key data field, determining an additional project cost to implement said change to said at least one key data field, sending an invoice for said additional project cost to a customer, and canceling one or more activities for said project.

6. A system for conditionally controlling a change made to a key data field in a project management application, comprising:

a memory medium comprising program instructions;
a bus coupled to the memory medium; and
a processor, for executing the program instructions, coupled to a project management application via the bus that when executing the program instructions causes the system to:

defining a plurality of key data fields in a project database for managing said project;

flag, within the project database stored in computer-readable memory, a key data field of the plurality of key data fields, the flag causing a change to data content of the key data field to automatically trigger one or more pre-specified actions in said project management application at a particular time period corresponding to when said change is made, record said change made to said key data field;
establish one or more metrics to be monitored pertaining to progress of the project, each of said one or more metrics having one or more pre-specified conditions that when met trigger performance of the one or more pre-specified actions, wherein said one or more metrics comprise: time period for said project, percent of project budget expended for said project, percent of work completed for said project and specific milestones surpassed for said project;

monitor, by a conditional controls component, the one or more metrics;

define, in said conditional controls component, one or more pre-specified actions for at least one key data field of said plurality of key data fields in said project management application for managing said project, said one or more pre-specified actions being defined in accordance with a level of control over changes that may be made to said at least one key data field of said plurality of key data fields to be exercised, wherein said level of control is selected from a plurality of progressively restrictive levels of control defining who is permitted to make changes to said at least one key data field of said plurality of key data fields;

perform, using said conditional controls component, at least one pre-specified action of said one or more pre-specified actions in response to a relative impact to said project caused by said change made to said at least one key data field, wherein said at least one pre-specified action performed corresponds to a respective level of control over changes that may be made to said at least one key data field of said plurality of key data fields to be exercised in response to said relative impact to said project depending at least in part on said time period corresponding to said change, and wherein said respective level of control to be exercised increases with time;

each of said one or more pre-specified conditions having an associated level of control over changes that may be made to said key data field in said project management application and one or more pre-specified actions to be taken when a pre-specified condition is met, depending at least in part on said time period corresponding to said change, such that an increasing level of control over time over changes that may be made to said key data field in said project management application is exercised when performing said at least one pre-specified action in response to said change made to said key data field as said project progresses, wherein said associated level of control is selected from a plurality of progressively restrictive levels of control over changes that may be made to said key data field in said project management application each of the plurality of progressively restrictive levels of control defining who is permitted to make changes to said key data field in said project management application;

after achievement of a pre-established date and budget threshold value, triggering, by a change to a key data field, a pre-specified action, by the computer system, comprising emailing a notification to members of a change review board, along with a set of financial consequences quantified in monetary or labor units caused by said change to the key data field, the notification requiring review a reply with an approval before proceeding with the change to the key data field;

send a communication regarding said at least one pre-specified action of said one or more pre-specified actions performed; and sending an invoice for the set of financial consequences.

7. The system according to claim 6, wherein the level of control is based on at least one pre-specified condition, of said one or more pre-specified, conditions being met.

8. The system according to claim 7, wherein said at least one pre-specified action comprise at least one of: logging said change to said key data field, preventing said change to said key data field from being finalized based upon a field value of said key data field, preventing said change to said key data field from being finalized based upon a field value of another data field in said project management application, preventing said change to said key data field, sending notification of said change to a distribution list of users, restricting access to change said key data field to a list of approved users, requiring approval from one or more users prior to finalizing said change, determining an additional project cost to implement said change, sending an invoice for said additional project costs to a customer, and canceling one or more activities for said project.

9. A computer program product for implementing one or more pre-specified actions in response to a change made to a key data field in a project management application for a project, said computer program product comprising:
 a non-transitory computer readable storage medium;
 program instructions to define a plurality of key data fields in a project database for managing said project;
 program instructions to flag, within the project database stored in computer-readable memory, a key data field of the plurality of key data fields, the flag causing a change to data content of the key data field to automatically trigger one or more pre-specified actions;
 program instructions to record said change made to said key data field;
 program instructions to establish one or more metrics to be monitored for the project, each of said one or more metrics having one or more pre-specified conditions that when met trigger performance of the one or more pre-specified actions, wherein said one or more metrics comprise: time period for said project, percent of project budget expended for said project, percent of work completed for said project and specific milestones surpassed for said project;
 program instructions to define the one or more pre-specified actions to be performed for the key data field of a plurality of key data fields, each of said one or more pre-specified actions corresponding to a level of control selected from a plurality of progressively restrictive levels of control over changes that may be made to said key data field of a plurality of key data fields to be exercised in response to a change made to said key data field of said plurality of key data fields at a particular time period corresponding to said change made in said project, wherein said level of control of the plurality of progressively restrictive levels of control over changes that may be made to said key data field of a plurality of key data fields defines who is permitted to make changes to said key data field of a plurality of key data fields;
 program instructions to establish one or more metrics to be monitored for said project, each of said one or more metrics having one or more pre-specified conditions, such that said change made to said key data field that meets a pre-specified condition triggers implementation of said one or more pre-specified actions, wherein said one or more metrics comprise: time period for said project, percent of project budget expended for said project, percent of work completed for said project and specific milestones surpassed for said project;
 program instructions to implement at least one pre-specified action of said one or more pre-specified actions defined based on said pre-specified condition that is met and corresponding to said level of control over changes that may be made to said key data field of a plurality of key data fields to be exercised in response to said change made to said key data field depending at least in part on said time period corresponding to said change, wherein said respective level of control over changes that may be made to said key data field of a plurality of key data fields to be exercised increases with time;
 after achievement of a pre-established date and budget threshold value, triggering, by a change to a key data field, a pre-specified action comprising a notification e-mailed to members of a change review board, along with a set of financial consequences quantified in monetary or labor units caused by said change to the key data field, the notification requiring review a reply with an approval before proceeding with the change to the key data field; and wherein said instructions are stored on said non-transitory computer readable storage medium;
 send a communication regarding said at least one pre-specified action of said one or more pre-specified actions performed; and
 program instructions to send an invoice for the set of financial consequences.

10. The computer program product according to claim 9, wherein said second program instructions include instructions to monitor whether or not said one or more pre-specified conditions associated with said one or more metrics have been met in order to trigger performance of said at least one pre-specified action in response to said change made to said key data field.

11. The computer program product according to claim 10, wherein said level of control is dictated by said pre-specified condition met for said one or more metrics monitored.

12. The computer program product according to claim 11, wherein the level of control is based on at least one pre-specified condition, of said one or more pre-specified conditions, being met.

13. The computer program product according to claim 9, wherein said one or more pre-specified actions comprise at least one of: logging said change to said data field, preventing said change to said data field from being finalized based upon a field value of said data field, preventing said change to said data field from being finalized based upon a field value of another data field in said project management application, preventing said change to said at least one key data field, sending notification of said change to a distribution list of users, restricting access to change said data field to a list of approved users, requiring approval from one or more users prior to finalizing said change, determining an additional project cost to implement said change, sending an invoice for said additional project costs to a customer, and canceling one or more activities for said project.

14. A process for deploying a computing infrastructure comprising integrating computer-readable code into a computing system, wherein said code in combination with said computing system is capable of performing one or more pre-specified actions in response to a change made to a key data field in a project management application, said process comprising:
 defining a plurality of key data fields in a project database for managing said project;

flagging, within the project database stored in computer-readable memory, a key data field of the plurality of key data fields, the flagging causing a change to data content of the key data field to automatically trigger one or more pre-specified actions;

recording said change made to said key data field;

establishing one or more metrics to be monitored for a project, each of said one or more metrics having one or more pre-specified conditions that when met trigger performance of the one or more pre-specified actions, wherein said one or more metrics comprise: time period for said project, percent of project budget expended for said project, percent of work completed for said project and specific milestones surpassed for said project;

identifying one or more levels of control over changes that may be made to said key data field in the project management application to be exercised for a key data field of a plurality of key data fields based on a relative impact to said project caused by a change made to said key data field at a particular time period corresponding to said change made to said key data field for said project, wherein said one or more levels of control over changes that may be made to said key data field in a project management application is selected from a plurality of progressively restrictive levels of control, each of the plurality of progressively restrictive levels of control determines who is permitted to make changes to said key data field in a project management application;

establishing said one or more pre-specified actions to be performed in response to said change made to said key data field of said plurality of key data fields;

performing at least one action of said one or more pre-specified actions corresponding to a level of control of said one or more levels of control over changes that may be made to said key data field in a project management application to be exercised and triggered based on at least one pre-specified condition, of said one or more pre-specified conditions, being met, wherein said at least one action is performed in response to said change made to said key data field depending at least in part on said time period corresponding to said change made to said key data field, and wherein said respective level of control over changes that may be made to said key data field in a project management application to be exercised increases with time such that after achievement of a pre-established date and budget threshold value, a change to a key data field triggers a pre-specified action comprising a notification e-mailed to members of a change review board, along with a set of financial consequences quantified in monetary or labor units caused by said change to the key data field, the notification requiring review a reply with an approval before proceeding with the change to the key data field;

sending a communication regarding said at least one action of said one or more pre-specified actions performed; and sending an invoice for the set of financial consequences.

15. The method according to claim 1, further comprising restricting access to change the at least one key data field to a list of approved users.

\* \* \* \* \*